(12) United States Patent
White et al.

(10) Patent No.: US 6,279,932 B1
(45) Date of Patent: Aug. 28, 2001

(54) LOCK PIN RELEASE DEVICE FOR TRUCK TANDEM AXLE

(76) Inventors: William G. White, 1207 S. Lacey, Spokane, WA (US) 99202; James R. White, 2403 McDougal Pl., Alpine, CA (US) 91901

( * ) Notice: Subject to any disclaimer, the term of this patent is extended or adjusted under 35 U.S.C. 154(b) by 0 days.

(21) Appl. No.: 09/351,560

(22) Filed: Jul. 12, 1999

(51) Int. Cl.[7] .................................................. B62D 33/08
(52) U.S. Cl. .................................. 280/149.2; 267/64.12; 188/265; 188/300
(58) Field of Search ........................... 267/64.11, 64.12, 267/134, 136; 188/300, 265, 67, 321.11; 280/423.1, 477, 434, 432, 433, 149.2, 405.1, 407.1

(56) References Cited

U.S. PATENT DOCUMENTS

| | | | |
|---|---|---|---|
| 4,309,027 | * 1/1982 | Molders et al. | 267/64.12 |
| 4,723,765 | * 2/1988 | Pearson | 267/64.12 |
| 4,838,578 | * 6/1989 | Baxter | 280/149.2 |
| 5,028,067 | 7/1991 | Madura . | |
| 5,071,180 | * 12/1991 | Wiedehage et al. | 267/64.12 |
| 5,176,396 | 1/1993 | Hawthorne et al. . | |
| 5,449,190 | * 9/1995 | Ford | 280/149.2 |
| 5,456,484 | 10/1995 | Fontaine . | |
| 5,472,223 | 12/1995 | Hawthorne et al. . | |
| 5,505,475 | * 4/1996 | Turner | 280/149.2 |
| 5,516,138 | 5/1996 | Fontaine . | |
| 5,518,223 | * 5/1996 | Bivens | 267/64.12 |
| 5,529,148 | * 6/1996 | O'Leary | 267/64.12 |
| 5,620,195 | * 4/1997 | Wessels | 280/149.2 |
| 5,678,834 | * 10/1997 | Wise | 280/149.2 |

* cited by examiner

Primary Examiner—Daniel G. DePumpo
(74) Attorney, Agent, or Firm—Brown, Martin, Haller & McClain LLP

(57) ABSTRACT

A release device for a tandem axle of a semi-truck is a compressible piston and cylinder, with the piston rod extending out of one end of the cylinder and biased into an extended position by a biasing mechanism such as compressed gas in the cylinder. A latch on the cylinder is releasably engageable with an indent on the piston rod to hold it in a retracted position. A hook on the cylinder engages over the handle of a manual release rod for a truck tandem axle, with an enlarged head on the end of the piston rod bearing against part of the frame adjacent the release rod with the piston rod in the latched, retracted position. Release of the latch puts biasing force on the piston rod, urging the cylinder outwardly away from the frame to pull out the release rod.

9 Claims, 3 Drawing Sheets

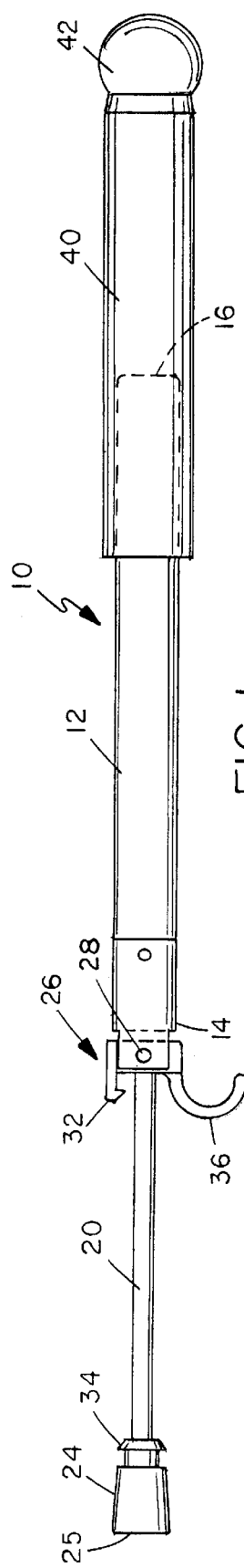
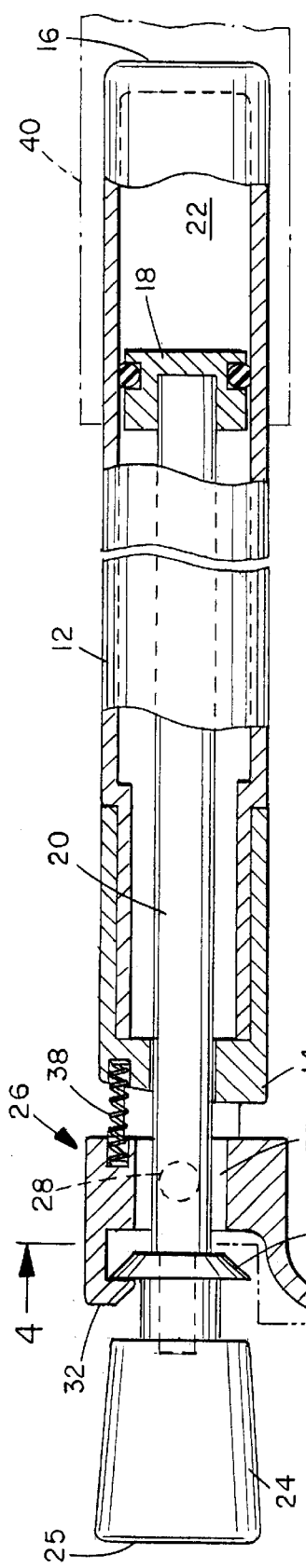
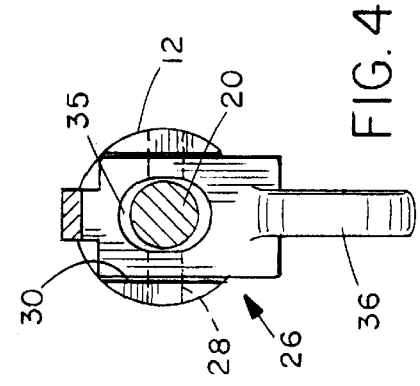

LOCK PIN RELEASE DEVICE FOR TRUCK TANDEM AXLE

BACKGROUND OF THE INVENTION

The present invention relates generally to tandem axles of semi trucks, and is particularly concerned with a lock pin release device for assisting in release of the lock pin of a tandem axle to permit adjustment of the position of the tandem wheels of the trailer depending on the load.

The tandem wheels of a semi truck trailer are releasably secured in position by means of oppositely directed lock pins engaging in any one of a series of openings in the trailer frame. The lock pins are linked to the tandem axle. The wheels often have to be moved to a different position to provide the best support depending on the load distribution in the trailer. The tandem axle must be released in order to re-position the wheels. The tandem axle lock pins are normally released manually by the driver pulling on a release rod which is linked to the two lock pins by means of a modified bell crank arrangement. It can be very difficult for the driver to pull out the release rod manually, particularly when the lock pins are not properly aligned in the respective frame openings. The driver may return to the truck cab and move the truck slightly in order to attempt to center the lock pins better. After each movement, the driver must return to the release rod and attempt to pull it again, unless a second person is available to pull the rod after each movement of the truck. Thus, it may take the driver 30 minutes or more to re-position the tandem wheels.

SUMMARY OF THE INVENTION

It is an object of the present invention to provide a new and improved device and method for assisting in release of the tandem axle of a semi truck.

According to one aspect of the present invention, a lock pin release device for a semi truck is provided, which comprises a cylinder having opposite first and second ends, a piston slidably mounted in the cylinder, a shaft secured to the piston and extending out of the first end of the cylinder, the shaft having an outer free end, an enlarged head at the outer free end of the shaft having a flat face for bearing against the frame of a semitrailer adjacent a tandem axle release rod, the piston and shaft being movable between a retracted position in which substantially all of the shaft is within the cylinder and the head is located adjacent the first end of the cylinder, and an extended position in which a major portion of the shaft extends out of the cylinder; a biasing mechanism in the cylinder between the second end of the cylinder and the piston biasing the piston and shaft into the extended position, a releasable latch mechanism at the second end of the cylinder for releasably securing the shaft in the retracted position, and a hook member projecting from the cylinder for releasable engagement with a handle of a tandem axle release rod, whereby, when the flat face of the head is placed against the frame with the hook engaging the release rod handle and the cylinder projecting outwardly from the frame, and the latch mechanism is released, the piston and shaft move towards the extended position to pull out the release rod and release the semi tandem axle.

Preferably, the biasing mechanism comprises compressed gas between the second end of the cylinder and the piston. When the latch is released with the device in position and the hook member engaging the release rod handle, cylinder pressure is applied to the release rod. If the lock pin or pins are not properly centered, for example if they are engaging the edge of the opening to prevent release, the truck driver can simply move the truck slightly. As soon as the lock pins are properly aligned, the piston shaft will be able to extend and pull out the release rod. The fully extended second end of the cylinder will be visible in the driver's side mirror, so that the driver will know when the tandem axle is released.

The latch mechanism preferably comprises a latch member pivotally mounted in a diametrical groove in the first end of the cylinder, with a through bore through which the piston shaft slidably projects. The piston shaft has an indent or groove adjacent the head, and the latch member has a latch finger movable between a first position engaging the indent to hold the head of the shaft in the retracted position adjacent the first end of the cylinder, and a second position in which the latch member is pivoted slightly to move the latch finger out of the indent. Preferably, the hook member projects from the opposite side of the latch member. A biasing spring urges the latch finger into the first position.

The cylinder may be provided with an indicator extension at its second end which is of sufficient length and size to be readily visible to the truck driver when the cylinder and release rod are extended. This avoids the need for the truck driver to have to move the truck, step out of the cab to check whether the release rod is movable, return to the cab to move the truck again, and repeat the process until the release rod is released. The tool or device of this invention reduces this to a one step operation, comprising simply engaging the piston head against the frame and the hook over the release rod handle, releasing the latch, and moving the truck one time only if necessary until movement of the cylinder is seen from the cab.

According to another aspect of the present invention, a method of releasing a semi truck tandem axle is provided, which comprises the steps of compressing a piston rod into a retracted position in a cylinder, latching the piston rod in the retracted position, engaging an enlarged head at the outer end of the piston rod against a semitrailer frame adjacent a manual release rod for the tandem axle so that the cylinder projects perpendicularly outwardly from the frame, engaging a hook on the cylinder around a handle of the release rod, and releasing the latch to release the piston rod so that the piston rod is urged outwardly from the cylinder and bears against the frame to bias the cylinder and release rod outwardly away from the frame in order to release the tandem axle. If the release rod is not able to move, due to the tandem axle lock pin or pins binding against the edge of the frame opening or openings, the method includes the step of moving the truck until the or each lock pin is aligned with respective frame opening, permitting the cylinder and release rod to move outwardly.

The release device or tool and method of this invention considerably reduces the time and effort required to re-position the tandem wheels of a semi-truck. As noted above, it sometimes took 30 minutes or more to release the tandem axle by manually pulling out the release rod. With the release device of this invention, it is possible to release the tandem axle in less than five minutes.

BRIEF DESCRIPTION OF THE DRAWINGS

The present invention will be better understood from the following detailed description of a preferred embodiment of the invention, taken in conjunction with the accompanying drawings in which like reference numerals refer to like parts and in which:

FIG. 1 is a side view of the lock pin release or actuator device according to a preferred embodiment of the invention in the extended or unloaded position;

FIG. 2 is an enlarged side view, with portions cut away, showing the actuator device in the loaded and latched position;

FIG. 3 is a partial top view of the structure of FIG. 2;

FIG. 4 is a sectional view taken on line 4—4 of FIG. 2;

DESCRIPTION OF THE PREFERRED EMBODIMENT

Figure 5:
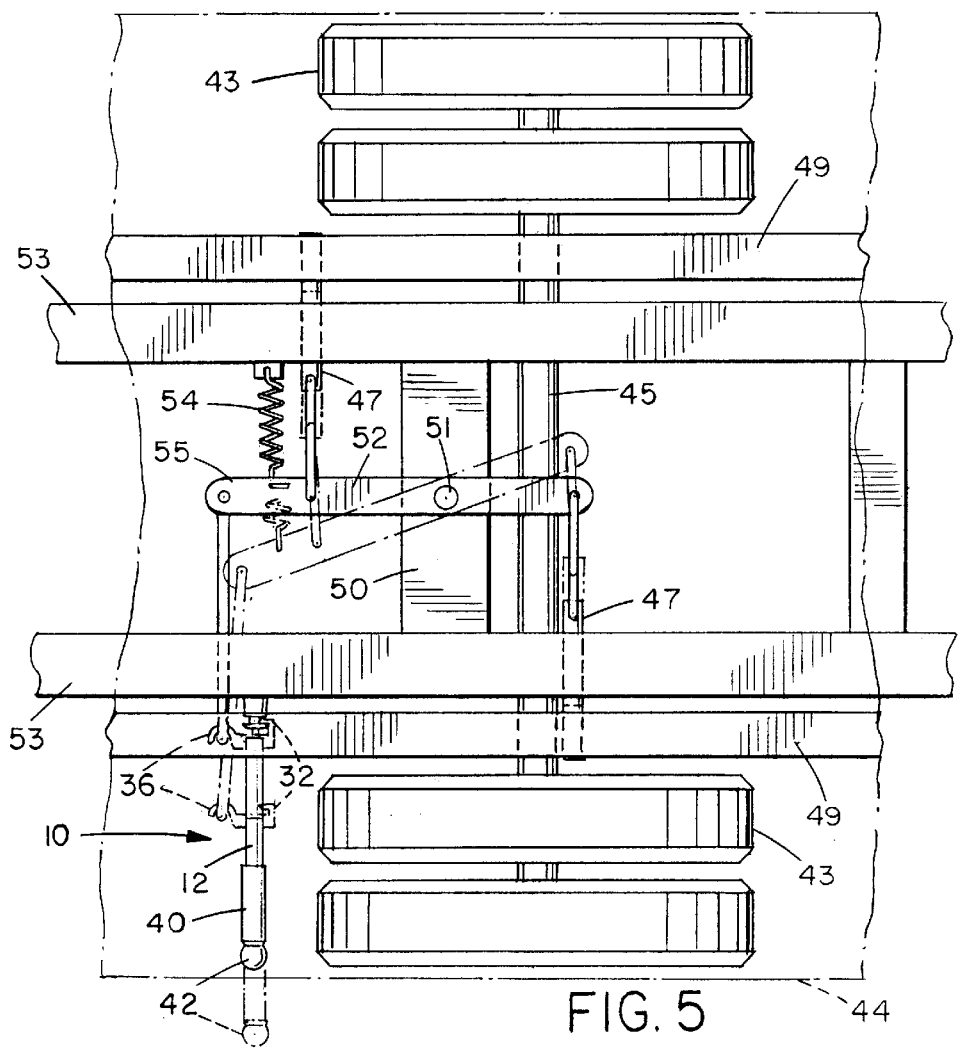
FIG. 5 is a top view of a typical lock pin mechanism of a truck chassis, with the actuator in place, the released position being indicated in broken line.
Figure 6:
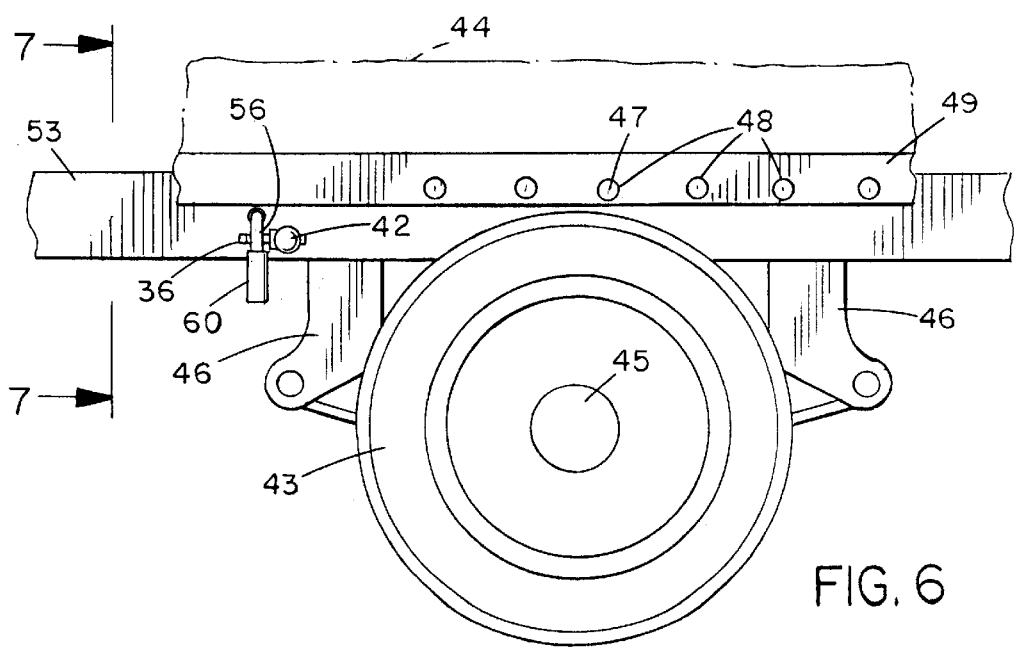
FIG. 6 is a side view of the structure of FIG. 5.

FIGS. 1–4 illustrate a lock pin release device or tool 10 according to a preferred embodiment of the invention, while FIGS. 5–8 illustrate the device in use to assist in releasing a semi truck's tandem axle. The device 10 basically comprises a cylinder 12 having opposite first and second closed ends 14,16, and a piston 18 slidably mounted in the cylinder with a piston rod 20 extending from the piston outwardly through an opening in the first end 14 of the cylinder. Preferably, a second end portion 22 of the cylinder between the piston 18 and second end 16 is filled with a compressed gas such as air, although other biasing means such as a spring may be used instead of compressed gas.

An enlarged head 24 is mounted at the outer end of the piston rod 20, and has a flat outer end face 25 for bearing against the frame of a truck, as described in more detail below in connection with FIGS. 5–8. The piston rod is movable between the retracted position of FIG. 2 and the fully extended position of FIG. 1 under the biasing force of the compressed gas in chamber 22, in the manner of a so-called "gas spring". A latch member 26 mounted at the second end of the cylinder is arranged to hold the piston rod in the retracted position until manually released simply by tilting the member 26 slightly.

The latch member 26 is illustrated in more detail in FIGS. 2 to 4, and is pivotally mounted via pivot pin 28 in a diametrical slot 30 across the second end face of the cylinder. The member 26 has a latch finger 32 projecting outwardly from one end for releasable engagement over an annular latch retainer ring 34 on rod 20. Rod 20 extends slidably through an opening 35 in the latch member 26. A hook 36 projects radially outwardly from the opposite end or side of the member 26 to latch finger 32. Spring 38 extends between the inner end face of groove 30 and the latch member 26 to bias the latch finger into latching engagement over ring 34.

Preferably, the device 10 also has an indicator extension member 40 which engages telescopically over the second end of the cylinder 12 and extends outwardly from the cylinder. Member 40 is preferably similar to a bicycle hand grip of padded, non-slip material to assist the user in gripping the cylinder when loading or compressing the piston rod into the cylinder. The grip preferably has a rounded outer tip 42 which may be brightly colored for better visibility, as discussed in more detail below.

FIGS. 5 to 8 illustrate how the device or tool 10 may be used to assist a truck driver in releasing the tandem wheels 43 when they need to be re-positioned relative to the truck body 44 based on load conditions. The linkage between the tandem wheels 43 and the truck body 44 is illustrated schematically in FIGS. 5 to 8. As illustrated, tandem axle 45 is suspended via suspension brackets 46 from the inner frame rails 53. A pair of oppositely directed lock pins 47 extend in opposite directions through openings in inner frame rails 53 into openings 48 on outer frame members or rails 49 on the truck or trailer body 44 to hold the tandem wheels in a selected position relative to the truck body. A series of spaced openings 48 will be provided on each rail 49 so that the tandem axle position may be adjusted.

Figure 7:
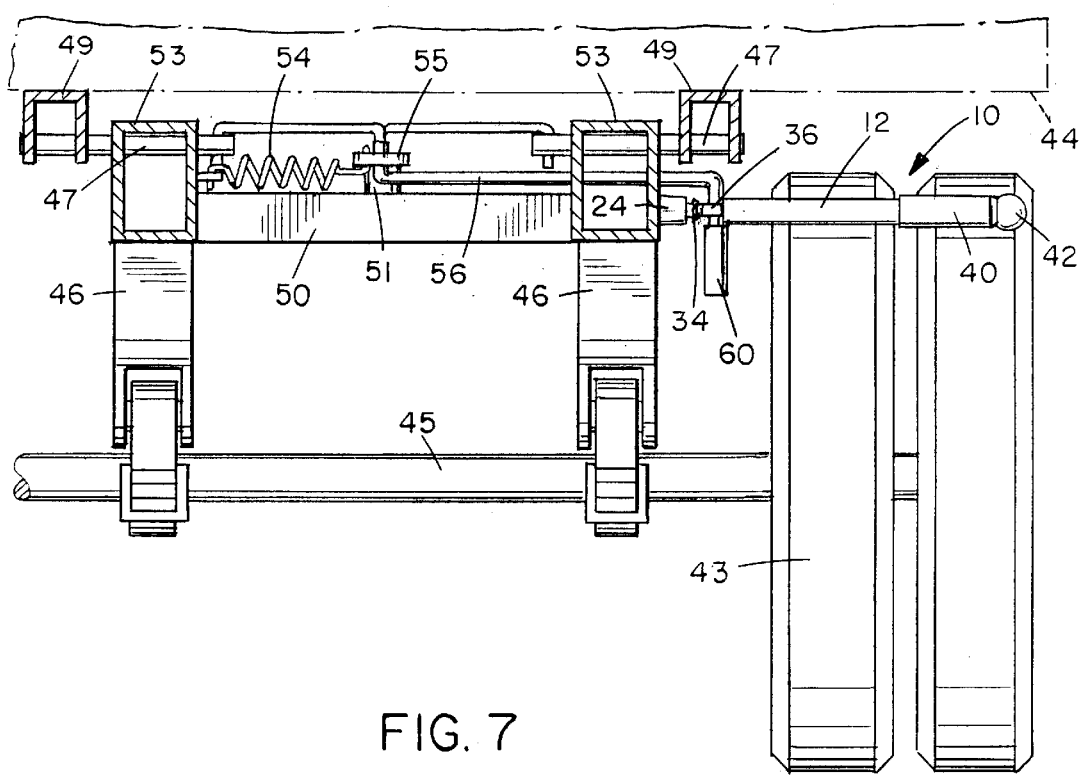
FIG. 7 is an enlarged sectional view taken on line 7—7 of FIG. 6, with the mechanism in locked position.

Suspension 46 has a cross member or center bracket 50 which is linked via pivot 51 to a modified bell crank assembly 52. The bell crank assembly 52 has opposite ends linked to the oppositely directed lock pins 47, as best illustrated in FIG. 5. A spring 54 extending between one end 55 of the bell crank 52 and the inner frame rail 53 biases the bell crank to rotate in a clockwise direction about pivot 51, urging lock pins 47 in opposite directions into the respective aligned frame openings 48, as illustrated in FIGS. 5 and 7. A release rod 56 extends in the opposite direction from the bell crank end 55 and outwardly through an opening in inner frame rail 46. A handle 60 is provided at the free end of release rod 56. A pull on release rod 56 will rotate the bell crank in an anti-clockwise direction and retract the lock pins 47 out of the respective openings, as illustrated in dotted outline in FIG. 5.

It can require great strength to pull out release rod 56 manually, even if the lock pins are properly aligned in the respective openings. If the lock pins are not centered in the respective frame openings, and bear against a side edge of the opening, it can be impossible to move the release rod. In such situations, the truck driver must return to the truck cab, and move the truck slightly in an attempt to center the lock pins to permit them to be retracted. The driver then returns to the release rod and attempts to pull it again. If it still will not move, the procedure must be repeated. It may take two people to pull out the release rod, and can take up to thirty minutes or more to properly position the lock pins for release.

The device or tool 10 of this invention avoids these problems and allows the tandem axle to be released much more readily than was possible in the past. The method of using this tool to pull out release rod 56 is illustrated in FIGS. 5 to 8. The device 10 is first compressed to latch the piston rod 14 in the retracted position of FIG. 2. This may be done easily by placing the flat end of head 24 on the ground, and pressing down on tip 42 until the piston rod is fully retracted and the latch finger 32 snaps over ring 34. The device 10 is then positioned as illustrated in FIGS. 5 and 7, with the flat end 25 of head 24 against the inner frame rail 53 on one side of the truck, adjacent release rod 56, and the hook 36 engaging over the handle 60. The cylinder and indicator extension member then project perpendicularly outwardly away from the inner frame rail 53, as illustrated in FIGS. 5 and 7. The starting position of device 10 with piston rod retracted and latched and the hook 36 engaging over the handle of the release rod is illustrated in FIG. 7, and is also shown in solid outline in FIG. 5. As best illustrated in FIG. 7, the indicator extension 40 does not extend outwardly beyond the side of truck body 44 when in the retracted position.

Figure 8:
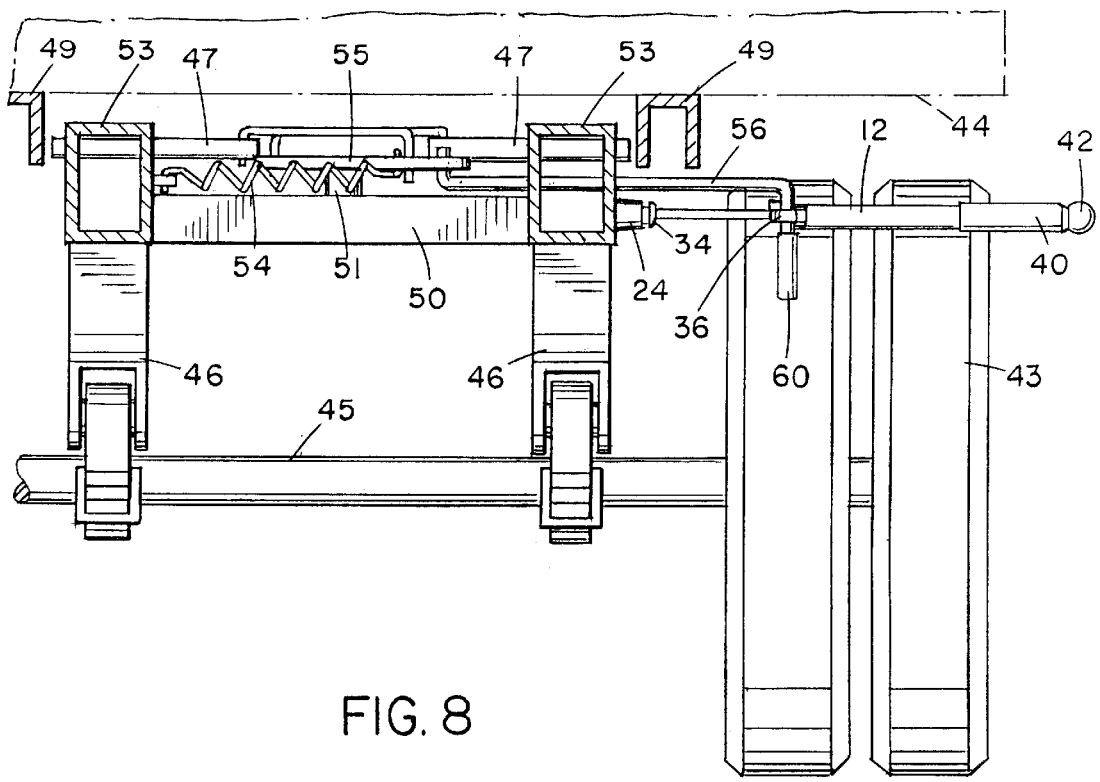
FIG. 8 is a view similar to FIG. 7, with the mechanism in released position.

The latch finger 32 is then released simply by rotating the latch member slightly to move finger 32 out of engagement with latch ring 34. This applies the compressed gas pressure in cylinder 12 to the release rod 56. If the lock pins 47 are not binding against the edges of the respective openings 48, the release rod 56 will be free to be pulled out by hook 36 as the cylinder 12 is pushed outwardly away from the frame and the piston and rod move into the fully extended position of FIGS. 1 and 8. However, the more normal case will be that the release rod 56 is not free to move due to the lock pins engaging against the edges of their respective openings. The truck driver then returns to the cab of the truck and moves the truck slightly. As soon as the lock pins are properly aligned in their openings, the release rod 56, and thus the cylinder 12, will be free to move. Since the piston rod cannot move, the cylinder will be urged outwardly into the fully extended position, pulling the release rod along with it. The indicator tip 42 is arranged to project beyond the side of the truck when the cylinder is fully extended, as illustrated in FIG. 8, and will be visible to the truck driver in this position. Thus, the driver will know when the release rod has been pulled out without having to repeatedly leave the cab to check, and simply has to move the truck until the extended indicator tip is visible.

As the release rod is pulled outwardly by the extension of the cylinder 12, it will in turn pull on the end of the bell crank lever 52, rotating the lever about pivot 51 and pulling the lock pins 47 out of the respective openings 48, as illustrated in dotted outline in FIG. 5. The tandem axle will therefore be released, and the tandem wheels can be moved to a new position. As soon as the desired position of wheels relative to the truck body is reached, the release rod 56 is released by unhooking it from the device 10, so that the spring 54 pulls rod 56 back into the retracted position, simultaneously rotating the bell crank lever 52 to extend the lock pins 47 back through the new aligned frame openings 48 in the new tandem wheel position.

The amount of extension provided by the movement of the piston rod from the retracted position to the extended position is determined based on the amount of movement required to extend the release rod and release the lock pins from their respective openings. Typically, an extension of the order of 10" to 15" ($2.54\times10^{-1}$ m to $3.81\times10^{-1}$ m) will be sufficient. The pressure of air in the cylinder is preferably 80 to 90 lbs. (36.3 to 40.9 Kg.).

The lock pin release device of this invention has the advantage that it does not require any modification to existing truck tandem wheel assemblies, but is a separate tool that can be used with any semi truck. It is quick and easy to use, and considerably reduces the time needed for a truck driver to move the tandem wheels. It may also be adapted to assist in release of a fifth wheel to release a tractor from a trailer. The device is of simple and inexpensive construction, and allows one person to readily release the tandem axle without needing help.

Although a preferred embodiment of the invention has been described above by way of example only, it will be understood by those skilled in the field that modifications may be made to the disclosed embodiment without departing from the scope of the invention, which is defined by the appended claims.

We claim:

1. A lock pin release device for a semi truck, comprising:
 a cylinder having a longitudinal axis and opposite first and second ends;
 a piston slidably mounted in the cylinder to divide the cylinder into separate first and second chambers on opposite sides of the piston;
 a shaft secured to the piston and extending through the first chamber and out of the first end of the cylinder, the shaft having an outer free end;
 an enlarged head at the outer free end of the shaft having a flat face for bearing against a portion of a frame adjacent a tandem axle release rod;
 the piston and shaft being movable between a retracted position in which substantially all of the shaft is within the cylinder and the head is located adjacent the first end of the cylinder, and an extended position in which a major portion of the shaft extends out of the cylinder;
 a biasing mechanism in the second chamber of the cylinder between the second end of the cylinder and the piston biasing the piston and shaft into the extended position;
 a releasable latch mechanism at the first end of the cylinder for releasably securing the shaft in the retracted position; and
 a hook member projecting outwardly from the cylinder in radial direction transverse to the longitudinal axis of the cylinder, the hook having a generally rounded indent facing in a direction parallel to and spaced outwardly from the cylinder longitudinal axis for releasable engagement over a handle of a tandem axle release rod, whereby, when the flat face of the head is placed against the frame with the hook engaging the release rod handle and the cylinder projecting outwardly from the frame, and the latch mechanism is released, the piston and shaft move towards the extended position to pull out the release rod and release the semi tandem axle.

2. The device as claimed in claim 1, wherein the biasing mechanism comprises compressed gas.

3. The device as claimed in claim 1, wherein the latch mechanism comprises a latch member pivotally mounted at the first end of the cylinder, the piston shaft having a latch indent adjacent the head, and the latch member having a latch finger for engaging in the indent to releasably latch the piston shaft in the retracted position, the latch member being movable between a first position in which the latch finger engages the indent, and a second position in which the latch finger is moved out of the indent.

4. The device as claimed in claim 3, wherein the shaft has an outwardly projecting annular ring adjacent said head, forming said latch indent.

5. The device as claimed in claim 3, including a biasing spring urging the latch finger into the first position.

6. The device as claimed in claim 1, including a gripping sleeve secured over the second end of the cylinder for gripping by a user when urging the piston rod into the retracted position.

7. The device as claimed in claim 6, wherein the gripping sleeve includes an extension projecting outwardly from the second end of the cylinder, the extension having an outer indicator tip, the extension being of predetermined dimensions such that the indicator tip projects outwardly from the side of a truck when the device is used and the piston rod is extended.

8. A lock pin release device for a semi truck, comprising:
 a cylinder having opposite first and second ends;
 a piston slidably mounted in the cylinder to divide the cylinder into separate first and second chambers on opposite sides of the piston;
 a shaft secured to the piston and extending through the first chamber and out of the first end of the cylinder, the shaft having an outer free end;
 an enlarged head at the outer free end of the shaft having a flat face for bearing against a portion of a frame adjacent a tandem axle release rod;
 the piston and shaft being movable between a retracted position in which substantially all of the shaft is within the cylinder and the head is located adjacent the first end of the cylinder, and an extended position in which a major portion of the shaft extends out of the cylinder;

a biasing mechanism in the second chamber of the cylinder between the second end of the cylinder and the piston biasing the piston and shaft into the extended position;

a releasable latch mechanism at the first end of the cylinder for releasably securing the shaft in the retracted position;

the latch mechanism comprising a latch member pivotally mounted at the first end of the cylinder, the piston shaft having a latch indent adjacent the head, and the latch member having a latch finger for engaging in the indent to releasably latch the piston shaft in the retracted position, the latch member being movable between a first position in which the latch finger engages the indent, and a second position in which the latch finger is moved out of the indent; and a hook member projecting from the latch member for releasable engagement with a handle of a tandem axle release rod, whereby, when the flat face of the head is placed against the frame with the hook engaging the release rod handle and the cylinder projecting outwardly from the frame, and the latch mechanism is released, the piston and shaft move towards the extended position to pull out the release rod and release the semi tandem axle.

9. The device as claimed in claim 8, wherein the cylinder has a diametrical slot extending across said first end, the latch member being pivotally mounted in said slot and having diametrically opposite first and second ends, the latch finger projecting outwardly from the first end of said latch member, and the hook member projecting outwardly from the second end of said latch member.

* * * * *